United States Patent [19]
Ochsenfeld et al.

[11] 3,949,049
[45] Apr. 6, 1976

[54] METHOD OF STRIPPING PLUTONIUM FROM TRIBUTYL PHOSPHATE SOLUTION WHICH CONTAINS DIBUTYL PHOSPHATE-PLUTONIUM STABLE COMPLEXES

[75] Inventors: Wilhelm Ochsenfeld; Helmut Schmieder, both of Karlsruhe, Germany

[73] Assignee: Gesellschaft fur Kernforschung m.b.H., Karlsruhe, Germany

[22] Filed: Mar. 10, 1972

[21] Appl. No.: 233,822

Related U.S. Application Data
[63] Continuation of Ser. No. 806,976, March 13, 1969, abandoned.

[30] Foreign Application Priority Data
Mar. 13, 1968 Germany............................ 1667843

[52] U.S. Cl. ............... 423/10; 260/429.1; 423/251
[51] Int. Cl. ...................... B01d 11/04; C22b 61/04
[58] Field of Search........ 423/10, 251; 252/301.1 R; 260/429.1

[56] References Cited
UNITED STATES PATENTS

3,276,850    10/1966    Rainey................................. 423/10
3,343,925    9/1967     Bathellier........................... 423/251
3,387,945    6/1968     Boudry et al. ....................... 423/10

OTHER PUBLICATIONS

Stoller et al., Reactor Handbook, Vol. II, Fuel Reprocessing, Interscience Publishers Inc., 1961, pp. 126–127.

Biddle et al., *Solvent Extraction Chemistry of Metals*, McKay et al. ed. Macmillan, London, 1966, pp. 133–160.

*Primary Examiner*—Benjamin R. Padgett
*Assistant Examiner*—E. A. Miller
*Attorney, Agent, or Firm*—Spencer & Kaye

[57] ABSTRACT

Fast breeder fuel elements which have been highly burnt-up are reprocessed by extracting uranium and plutonium into an organic solution containing tributyl phosphate. The tributyl phosphate degenerates at least partially into dibutyl phosphate and monobutyl phosphate, which form stable complexes with tetravalent plutonium in the organic solution. This tetravalent plutonium is released from its complexed state and stripped into aqueous phase by contacting the organic solution with an aqueous phase containing tetravalent uranium.

6 Claims, 1 Drawing Figure

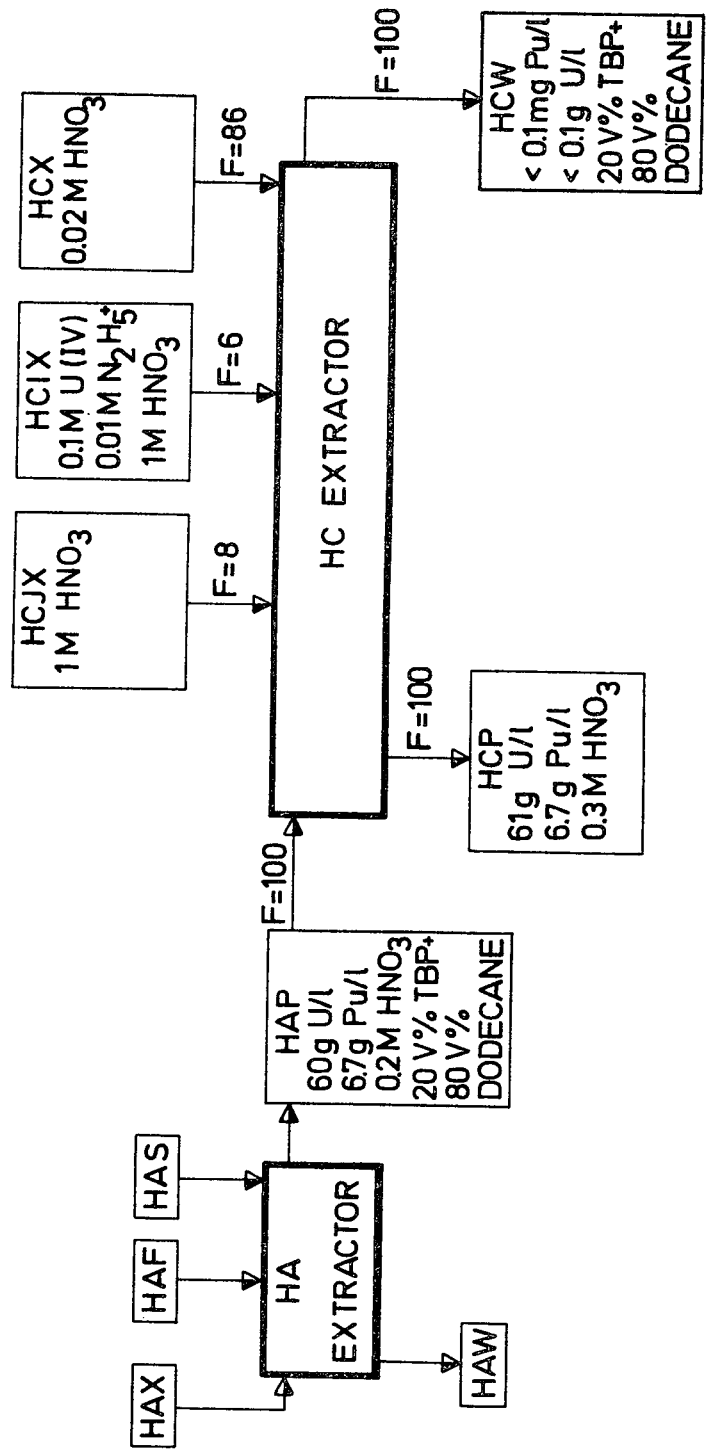

METHOD OF STRIPPING PLUTONIUM FROM TRIBUTYL PHOSPHATE SOLUTION WHICH CONTAINS DIBUTYL PHOSPHATE-PLUTONIUM STABLE COMPLEXES

CROSS-REFERENCE TO RELATED APPLICATION

This application is a continuation of application Ser. No. 806,976, filed Mar. 13th, 1969, now abandoned.

The invention relates to a method of complete stripping into the aqueous phase of valuable tetravalent metals, especially of tetravalent plutonium, from acid organo-phosphorus compounds forming particularly stable complexes with the tetravalent metals, which compounds are either used primarily as extraction agents or as additives in a mixture of extracting agents, or are secondarily produced by decomposition of neutral organo-phosphorus compounds.

Such acid organo-phosphorus compounds, which are used primarily or produced secondarily, are, for instance, mono and dialkyl, mono and diaryl phosphates respectively, phosphates, phosphinates. For instance, the mixture of the extracting agent of neutral tributyl phosphate (TBP) and an organic diluent, almost exclusively used now in the reprocessing of irradiated nuclear fuels by liquid-liquid extraction, exhibits undesirable decomposition phenomena which are caused by radiolysis, on the one hand, and by hydrolysis, on the other hand, with the acid organo-phosphorus compounds mentioned above, especially dibutyl phosphate (DBP) and monobutyl phosphate (MBP), being produced. These organo-phosphorus acids form very stable complexes, mainly with the tetravalent metal ions, so that the stripping of these materials from the organic phase proves to be very difficult. Very marked decomposition and related special difficulties in the stripping of tetravalent valuable metals occur in the highly active first extraction cycle so that, in this cycle, the losses of valuable material, especially those of plutonium, can become quite considerable. They are the higher, the more radiolysis and hydrolysis of the extracting agent and mixture of extracting agents, respectively, are observed.

While, e.g., the irradiation of an extracting agent of 20 v/o TBP and 80 v/o n-dodecane with a content of 0.3 M $HNO_3$ produces some 30 mg of DBP per liter of extracting agent and per Wh, this quantity is increased to some 200 mg dbp/l in a two-phase mixture of the extracting agent and an aqueous solution containing 1.5–3 M $HNO_3$. An extracting agent with the DBP content mentioned last, for instance, retains at least 110 mg of plutonium per liter extracting agent bound in the organic solution which cannot be washed out by the usual stripping agents. Even in the reprocessing of highly burnt-up plutonium-bearing fuel elements with some 10 % plutonium content this means a plutonium loss of the order of a few percent, which is no longer bearable economically.

With the nuclear fuels and/or fertile materials with high burnups to be reprocessed in the future, the decomposition phenomena of the extracting agent and the consequent losses of valuable tetravalent actinides, especially of plutonium, will be very high, for the reasons mentioned above. In the future, the burnups of nuclear fuel elements will frequently be around 30,000 MWd/t with thermal power reactors and with the joint reprocessing of mixtures of the core and blanket materials of breeders. In the case of fast breeders, the core fuel will even have a burnup of about 100,000 MWd/t.

However, the acid organo-phosphorus compounds mentioned above are not always undesirable components of the extracting agent produced by radiolysis and hydrolysis of neutral organo-phosphorus compounds. There are also applications in which they are directly used as the extracting agents proper, especially for tetravalent metals, because of their well-known extraction capability. However, this results in difficulties in washing these metals out of the organic phase. An extracting agent of this kind frequently used is di-2 ethylhexyl phosphoric acid (D2EHPA) or HDEHP). For stripping of the tetravalent metals especially of tetravalent plutonium, form diluted (D2EHPA) solutions complexing agents, such as oxalic acid, have been used with more or less satisfactory success so far.

It is the purpose of the invention to find a method of a simple and complete stripping of valuable tetravalent metals from acid organo-phosphorus compounds forming specially stable complexes with them. Another purpose of the invention is the intention, by providing for a suitable stripping agent for the first extraction cycle, to make the Purex process applicable also to the reprocessing of highly irradiated nuclear fuel and/or fertile materials, with particular emphasis being placed on the recovery of plutonium.

In the invention, this problem is solved by using an aqueous solution of U(IV) for stripping. It is particularly advantageous to use an aqueous U(IV) nitrate solution, because this would introduce the smallest amount of foreign substances into the process that would contaminate the product.

It is known that Pu(IV) can be reduced to Pu(III) by U(IV) and that, because of the great differences in the distribution coefficients of Pu(III) and U(VI) between a neutral TBP solution and an aqueous nitric acid solution, a separation of plutonium and uranium is possible in the Purex process. However, in the method according to the invention, U(IV) is used for the complete stripping of plutonium from acid organo-phosphorus compounds, which include dibutyl and monobutyl phosphates formed in the decomposition of neutral TBP, the plutonium bound in the organic solution being transferred to an aqueous solution practically completely.

It was found e.g., that the tetravalent plutonium bound to dialkyl phosphoric acid is best stripped from the organic solution by means of U(IV) nitrate. This reduces Pu(IV) to Pu(III), replacing it by uranium (IV) in the dialkyl phosphoric acid.

It is by the method according to the invention that extractive reprocessing of plutonium-bearing irradiated fuel elements with a high burnup corresponding to that of a breeder core of 80,000 to 100,000 MWd/t becomes possible without significant losses of plutonium and that the doubts hitherto existing with respect to the applicability of the liquid-liquid extraction process, especially the Purex process, are removed.

In addition, it is no longer necessary under this aspect to provide for long cooling times of the highly burnt-up nuclear fuel and/or fertile material until this material is suitable for reprocessing by the familar and proven methods of reprocessing after proper decay of the activity.

The invention will be described on the basis of the examples outlined below and of a flowsheet however, with indications of dimensions and figures implying no limitation of the invention. Instead, it is possible to conduct the process successfully also in a modified version under the available guiding lines.

Example 1

A solution of 20 v/o TBP and 80 v/o n-dodecane, which contained 5 g Pu/l and had been exposed to alpha radiation of 130 Wh/l, was intensively mixed with the same volume of an aqueous solution containing 0.2 M U(IV) — 0.4 M $HNO_3$ — 0.02 M $N_2H_5NO_3$. After separation of the phases, the organic solution contained 20 mg Pu/l, that is 4‰ of the plutonium introduced.

Example 2

20 v/o TBP and 80 v/o n-dodecane were mixed with an aqueous solution of 3 M $HNO_3$ under continuous stirring by simultaneous irradiation with a Co-60 source. The extracting agent, TBP-dodecane, received a radiation dose of 0.85 Wh/l, which produced about 200 mg of DBP per liter. After equilibration of the irradiated extracting agent with a plutonium (IV) nitrate solution the TBP-dodecane containing 5 g Pu/l was washed repeatedly with the same volume of an aqueous 0.01 M U(IV) — 0.4 M $HNO_3$ — 0.01 M $N_2H_5NO_3$ solution. After three washes, the plutonium content of the extracting agent was less than 0.1 mg Pu/l (<0.02‰ of the plutonium).

Other reducing agents, such as hydroxylamine or hydrazine, succeeded in only removing 50 % of the plutonium bound to DBP and MBP of the organic phase after repeated washing.

Example 3

An extracting agent consisting of 20 v/o TBP and 80 v/o dodecane treated as in the $2^{nd}$ example was subjected to a radiation dose of 4.4 Wh/l and contained 790 mg of DBP and 5 g Pu/l Pu/l before re-extraction. The extracting agent was repeatedly washed with the same volume of an aqueous solution containing 0.01 M U(IV) — 0.4 M $HNO_3$ — 0.01 M $N_2H_5NO_3$. After three washings, the plutonium content of the organic phase was reduced to <0.1 mg Pu/l, which corresponds to a content of <0.02 ‰ of the quantity of plutonium originally inroduced. With an 0.4 M or 0.02 M $HNO_3$ solution it was impossible even after five washings to wash out of the same organic solution the plutonium bound to DBP of about 500 mg Pu/l.

Example 4

A mixture of an aqueous 3 M $HNO_3$ solution and an extracting agent consisting of 20 v/o TBP and 80 v/o n-dodecane was exposed to an irradiation dose of 1.2 Wh/l of organic solution which corresponds to the conditions prevailing in the reprocessing of the core fuel of a fast breeder with a burnup around 80,000 MWd/t. Stripping in mixer settlers in countercurrent with an aqueous solution of some 0.006 M U(IV) + 0.3 M $HNO_3$ reduced the content of the organic solvent from 6.7 g PU/l to <0.1 mg/l Pu, corresponding to a loss of <0.015 ‰ .

The process applied in this case will be explained in greater detail on the basis of the flowsheet represented on the drawing: The flowsheet shows the first co-decontamination cycle of a process of reprocessing highly burnt-up nuclear fuel elements containing plutonium and uranium, the process of extraction not directly concerned by the invention being represented only in sketches. The columns of figures inside the frames indicate the concentrations of the individual solutions. The figures besides the pipelines and denoted by an F represent the flowrates of the respective solutions.

The nitric acid solution containing plutonium, uranium, and fission products HAF (=feed) is fed to the first extractor HA and the valuable materials plutonium and uranium are extracted by the extracting agent HAX, which consists of 20 v/o TBP and 80 v/o n-dodecane. This organic extracting agent HAX is decomposed during the extraction process as a result of the beta and/or gammma radiations of the fission products, which produces acid organo-phosphorus compounds such as DBP and MBP, which form particularly strong complexes with tetravalent plutonium and other tetravalent actinides. This organic phase containing the uranium and plutonium is scrubbed from the co-extracted fission products by a nitric acid aqueous solution HAS flowing in countercurrent. The fission products and other impurities leave the extractor HA in the aqueous waste solution HAW free from plutonium and uranium. The organic product HAP from the extractor HA containing uranium and plutonium flows to a second extractor HC where stripping of the plutonium and uranium from the organic phase HAP into the aqueous phase HCP is carried out. Usually, this is done by means of an 0.02 M $HNO_3$ solution HCX which is fed in at the other end of the extractor HC and thus flows through the extractor in countercurrent to the organic solution HAP. The concentration of this washing solution HCX must always be adjusted so that the $HNO_3$ concentration of the product HCP does not drop below 0.3 M in order to avoid Pu(IV) hydrolysis. For this purpose, 1 M $HNO_3$ solutions HCJX and HCIX are fed into various points of the extractor HC in such quantities that together with the 0.02 M $HNO_3$ solution HCX and the quantity of acid re-extracted from the organic solution results in an 0.3 M $HNO_3$ solution. Already the 0.3 M $HNO_3$ solution transfers a large portion of the plutonium into the aqueous phase. The residual Pu(IV) remaining in the organic phase HAP and mainly bound to DBP and MBP is reduced in the invention by an aqueous U(IV) nitrate solution HCIX, which is introduced roughly in the last third of the extractor HC and flows in countercurrent to the organic phase HAP and is pushed out of the organic phase. The uranium remaining in the organic phase is then washed by the aqueous 0.02 M $HNO_3$ solution HCX introduced at the end of the extractor HC and thus uranium can be recovered, save for small residues which remain bound to DBP.

Example 5

A solution of 0.03 M D2EHPA + 0.015 M TBP in n-dodecane which contained about 1.2 g Pu/l was shaken with the respective equal volume of an aqueous solution up to the establishment of equilibrium, after which the following quantities of plutonium remained in the organic solution:

| Aqueous solution used | Quantity of plutonium in organic solution |
|---|---|
| a) 0.01 M Fe(II) + 0.1 M $NH_3OH^+$ + 1 M $HNO_3$ | 0.94 g Pu/l (78 %) |
| b) 0.1 M Fe(II) sulfamate | 0.46 g Pu/l (38 %) |
| c) 0.1 M oxalic acid | 0.005 g Pu/l (4‰) |
| d) 0.1 M U(IV) + 0.01 M | 0.001 g Pu/l (1‰) |

| Aqueous solution used | Quantity of plutonium in organic solution |
|---|---|
| $N_2H_5^+$ + 1 M $HNO_3$ | 5 |

We claim:

1. A method of reprocessing highly irradiated nuclear fuel elements having a burnup of at least 30,000 MWd/t and containing plutonium and fission products, comprising the steps of contacting a first solution containing said plutonium and fission products with an organic solution of tributyl phosphate as extracting agent to extract at least 5 g/l of tetravalent plutonium into said organic solution, said organic solution receiving an irradiation dose of at least 0.85 Wh/l which converts part of the tributyl phosphate to dibutyl phosphate whereupon said dibutyl phosphate forms stable complexes with the tetravalent plutonium, and, following the step of extracting, stripping the plutonium into an aqueous solution by contacting said organic solution with an aqueous tetravalent uranium solution to reduce the tetravalent olutonium to trivalent plutonium, and to set free the plutonium from its complexed state with said dibutyl phosphate.

2. A method as claimed in claim 1, wherein at least 99.6% of the plutonium is stripped into the aqueous solution in the step of stripping.

3. A method as claimed in claim 1, wherein the tetravalent uranium is present in the form of uranium (IV) nitrate.

4. A method as claimed in claim 1, wherein the step of extracting is carried out under conditions such that the organic solution receives an irradiation dose of at least 1.2 Wh/l.

5. A method as claimed in claim 4, wherein the tetravalent uranium is present in the form of uranium (IV) nitrate.

6. A method as claimed in claim 4, wherein said highly irradiated nuclear fuel element is core fuel of a fast breeder with a burn-up of at least 80,000 MWd/t.

* * * * *